(12) United States Patent
Lawlor et al.

(10) Patent No.: US 10,661,467 B2
(45) Date of Patent: May 26, 2020

(54) MITER SAW WITH ADJUSTABLE FENCE

(71) Applicants: Robert Bosch Tool Corporation, Broadview, IL (US); Robert Bosch GmbH, Stuttgart (DE)

(72) Inventors: Michael J. Lawlor, Chicago, IL (US); Juergen Wiker, Schaumburg, IL (US)

(73) Assignees: Robert Bosch Tool Corporation, Broadview, IL (US); Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/044,867

(22) Filed: Jul. 25, 2018

(65) Prior Publication Data

US 2018/0361611 A1 Dec. 20, 2018

Related U.S. Application Data

(63) Continuation of application No. 14/149,551, filed on Jan. 7, 2014, now abandoned, which is a continuation
(Continued)

(51) Int. Cl.
*B27B 27/08* (2006.01)
*B27B 27/10* (2006.01)
(Continued)

(52) U.S. Cl.
CPC ............ *B27B 27/08* (2013.01); *B23D 45/044* (2013.01); *B27B 27/10* (2013.01); *Y10T 83/7613* (2015.04);
(Continued)

(58) Field of Classification Search
CPC ............ Y10T 83/7697; Y10T 83/8773; Y10T 83/7788; Y10T 83/762; B23D 45/044; B27B 27/04; B27B 27/08; B27B 27/10
(Continued)

(56) References Cited

U.S. PATENT DOCUMENTS 727,337 A 10/1902 Forster
1,816,069 A 7/1931 Bennett
(Continued)

FOREIGN PATENT DOCUMENTS

DE 19729522 A1 1/1999
EP 1405703 A1 4/2004
(Continued)

OTHER PUBLICATIONS

International Search Report Corresponding to International Patent Application No. PCT/US2011/068024 (5 pages).
(Continued)

*Primary Examiner* — Laura M Lee
(74) *Attorney, Agent, or Firm* — Maginot, Moore & Beck LLP (57) ABSTRACT

A miter saw includes a base, a turntable rotatable in relation to the base and including a work piece support surface, a support assembly attached to the turntable, and a saw assembly attached to the support assembly and configured to cut a work piece supported on the turntable. A fence assembly includes an elongate fence body that extends along a first axis. The elongate fence body is supported by the base and positioned over the turntable. The fence body has a first connecting structure, and a fence insert defining an elongate work piece abutment surface and having a second connecting structure. The fence assembly is positionable in a first configuration and a second configuration. In the first configuration, the second connecting structure cooperates with the first connecting structure to secure the fence insert at a first position in relation to the fence body. When the fence assembly is positioned in the second configuration, the second connecting structure cooperates with the first connecting structure to secure the fence insert at a second position in relation to the fence body. A second axis inter-
(Continued)

sects the first axis in a perpendicular manner. When the fence insert is secured at the first position, the elongate work piece abutment surface is positioned to intersect the second axis at a first point. When the fence insert is secured at the second position, the elongate work piece abutment surface is positioned to intersect the second axis at a second point, and the first point is offset from the second point along said second axis.

9 Claims, 7 Drawing Sheets

Related U.S. Application Data of application No. 12/983,423, filed on Jan. 3, 2011, now Pat. No. 8,621,970.

(51) Int. Cl.
*B23D 45/04* (2006.01)
*B23D 47/04* (2006.01)
*B23D 47/02* (2006.01)

(52) U.S. Cl.
CPC ........ *Y10T 83/7647* (2015.04); *Y10T 83/7697* (2015.04); *Y10T 83/8773* (2015.04)

(58) Field of Classification Search
USPC ......... 83/391, 490, 471.2–471.3, 581, 468.1, 83/468.2, 468.3, 468.7, 477.2, 471.1
See application file for complete search history.

(56) References Cited

U.S. PATENT DOCUMENTS

| | | |
|---|---|---|
| 5,181,448 A | 1/1993 | Terpstra |
| 5,337,641 A * | 8/1994 | Duginske ................ B27B 25/10 144/253.1 |
| 5,768,966 A | 6/1998 | Duginske |
| 5,829,333 A | 11/1998 | Itzov |
| 5,855,366 A | 1/1999 | Chang |
| 5,865,079 A | 2/1999 | Itzov |
| 6,021,700 A | 2/2000 | Garuglieri |
| 6,073,529 A | 6/2000 | Shibata et al. |
| 6,360,798 B1 | 3/2002 | Apolinski |
| 6,418,830 B1 | 7/2002 | Stumpf et al. |
| 6,520,225 B1 | 2/2003 | Dembicks |
| 6,557,601 B1 | 5/2003 | Taylor |
| 7,111,537 B2 | 9/2006 | Vallone |
| 7,114,425 B2 | 10/2006 | Romo et al. |
| 7,156,008 B2 | 1/2007 | Talesky |
| 7,367,253 B2 | 5/2008 | Romo et al. |
| 7,631,587 B2 | 12/2009 | Svetlik et al. |
| 2003/0140745 A1 | 7/2003 | Lewis |
| 2003/0228197 A1 | 12/2003 | Salvaryan |
| 2004/0103768 A1 | 6/2004 | Meredith |
| 2006/0101971 A1 | 5/2006 | Roe |
| 2007/0214926 A1 | 9/2007 | Ceroll et al. |
| 2009/0095141 A1 | 4/2009 | Billings et al. |
| 2009/0301277 A1 | 12/2009 | Ipatenco et al. |
| 2010/0269661 A1 * | 10/2010 | Cox ..................... B23D 45/048 83/471.3 |
| 2012/0160071 A1 | 6/2012 | Chen |

FOREIGN PATENT DOCUMENTS

| | | | |
|---|---|---|---|
| EP | 2103400 A2 | 9/2009 | |
| EP | 2156930 A2 | 2/2010 | |
| GB | 2389333 A | 12/2003 | |
| GB | 2459362 A * | 10/2009 | ........... B23D 45/048 |

OTHER PUBLICATIONS

Office Action for European Patent Application No. 11 810 976.8 (5 pages).

* cited by examiner

MITER SAW WITH ADJUSTABLE FENCE

CROSS-REFERENCE TO RELATED APPLICATIONS

This application is a continuation of U.S. patent application Ser. No. 14/149,551 entitled "MITER SAW WITH ADJUSTABLE FENCE" by Lawlor et al., filed Jan. 7, 2014, which is a continuation of U.S. patent application Ser. No. 12/983,423, now U.S. Pat. No. 8,621,970, entitled "MITER SAW WITH ADJUSTABLE FENCE" by Lawlor et al., filed Jan. 3, 2011, the disclosures of which are hereby incorporated herein by reference in their entireties.

TECHNICAL FIELD

This invention relates to the field of power saws, and particularly to power miter saws that have a fence.

BACKGROUND

A power miter saw is a cutting tool used to make crosscuts in a work piece, such as a piece of wood. Miter saws typically include a base equipped with a turntable and fence. The turntable is rotatable in relation to the base and has an upper surface that supports a work piece during cutting operations. The fence extends over the turntable to provide an abutment surface for locating an edge of the work piece at a predetermined position on the base.

The saw assembly of the miter saw includes a bevel arm, a cutting arm, and a cutting assembly. The bevel arm is pivotably attached to the turntable for pivotal movement about a bevel axis. The cutting arm is in turn pivotably attached to the bevel arm for pivotal movement toward and away from the turntable. The cutting arm supports the cutting assembly, comprising a circular saw blade and a motor, above the turntable. During cutting operations, the cutting arm is pivoted downwardly to bring the saw blade into contact with a work piece positioned on the turntable.

Miter saws have a cut capacity that defines the maximum sizes and dimensions of work pieces that a miter saw is capable of cutting through. The cut capacity includes a vertical component, also referred to as the cut height capacity, and a horizontal component, also referred to as the cut width capacity. The cut height and cut width capacity of a miter saw depend on a number of factors, such as the size of the saw blade, the depth that the blade is able to plunge below the upper surface of the turntable, the pivot location of the support arm with respect to the abutment surface of the fence, and the size of the motor, gearbox, and blade arbor.

Figure 8:
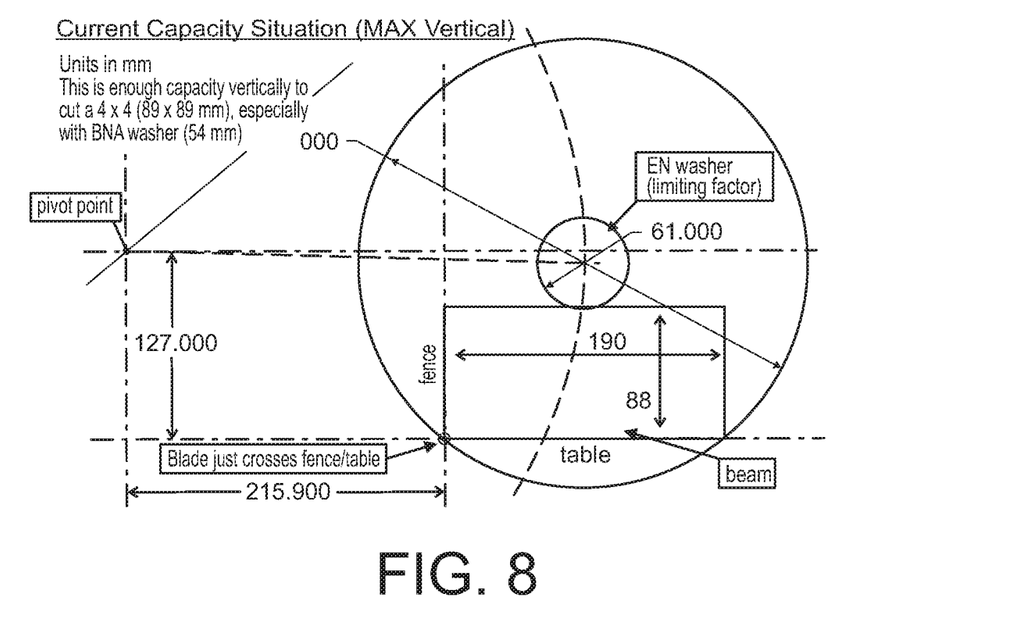
FIG. 8 is a side elevational view of a saw blade, a fence, and work piece showing the cut capacity prior to placing a spacer in front of the fence.
Figure 9:
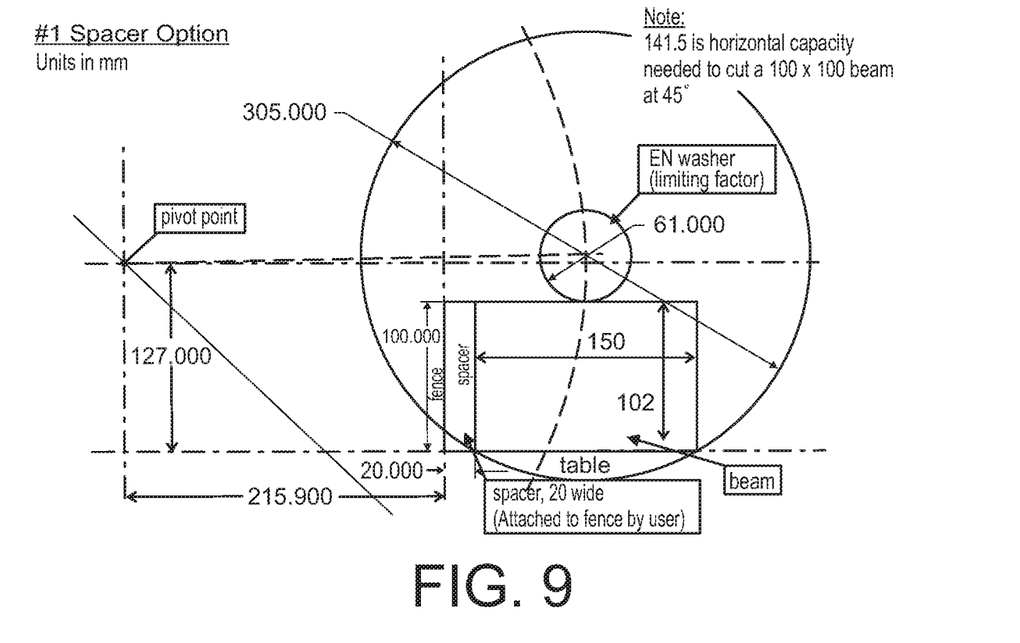
FIG. 9 is a side elevational view of a saw blade, a fence, and work piece showing the cut capacity prior to placing a spacer in front of the fence.

The cut height capacity of a miter saw may have to be adjusted to accommodate taller work piece sizes. One method used to increase the cut height capacity of a miter saw is to attach a sacrificial fence to the front of the fence. FIGS. 8 and 9 depict the cut width and cut height capacity of a miter saw before and after attaching a sacrificial fence to the miter saw fence. As depicted in FIG. 8, the miter saw has a cut width capacity of 190 mm, and a cut height capacity of 88 mm. As depicted in FIG. 8, the sacrificial fence has a thickness on the front of the fence of approximately 20 mm that results in an increase in cut height capacity to 102 mm and a decrease in cut width capacity to 150 mm. The use of the sacrificial fence allows the miter saw to have a cut capacity capable of cutting a 100 mm×100 mm cross section beam.

While effective in increasing cut height capacity, the use of sacrificial fences requires that time be spent selecting and/or fabricating a fence with a desired width and suitable shape for attachment to the miter saw fence. Time must also be spent in the installation and removal of the sacrificial fence. Because sacrificial fences are often made with scrap materials, sacrificial fences are often discarded after use requiring that another sacrificial fence be selected and/or fabricated to increase the cut height capacity of the miter saw for another job.

What is needed is a method or device that enables the cut height capacity of a miter saw to be increased without requiring the fabrication and installation of a separate sacrificial fence or spacer.

SUMMARY

A miter saw includes a base, a turntable rotatable in relation to the base and including a work piece support surface, a support assembly attached to the turntable, and a saw assembly attached to the support assembly and configured to cut a work piece supported on the turntable. A fence assembly includes an elongate fence body that extends along a first axis. The elongate fence body is supported by the base and positioned over the turntable. The fence body has a first connecting structure, and a fence insert defining an elongate work piece abutment surface and having a second connecting structure. The fence assembly is positionable in a first configuration and a second configuration. In the first configuration, the second connecting structure cooperates with the first connecting structure to secure the fence insert at a first position in relation to the fence body. When the fence assembly is positioned in the second configuration, the second connecting structure cooperates with the first connecting structure to secure the fence insert at a second position in relation to the fence body. A second axis intersects the first axis in a perpendicular manner. When the fence insert is secured at the first position, the elongate work piece abutment surface is positioned to intersect the second axis at a first point. When the fence insert is secured at the second position, the elongate work piece abutment surface is positioned to intersect the second axis at a second point, and the first point is offset from the second point along said second axis.

DESCRIPTION

For the purposes of promoting an understanding of the principles of the invention, reference will now be made to the embodiments illustrated in the drawings and described in the following written specification. It is understood that no limitation to the scope of the invention is thereby intended. It is further understood that the present invention includes any alterations and modifications to the illustrated embodiments and includes further applications of the principles of the invention as would normally occur to one of ordinary skill in the art to which this invention pertains.

Figure 1:
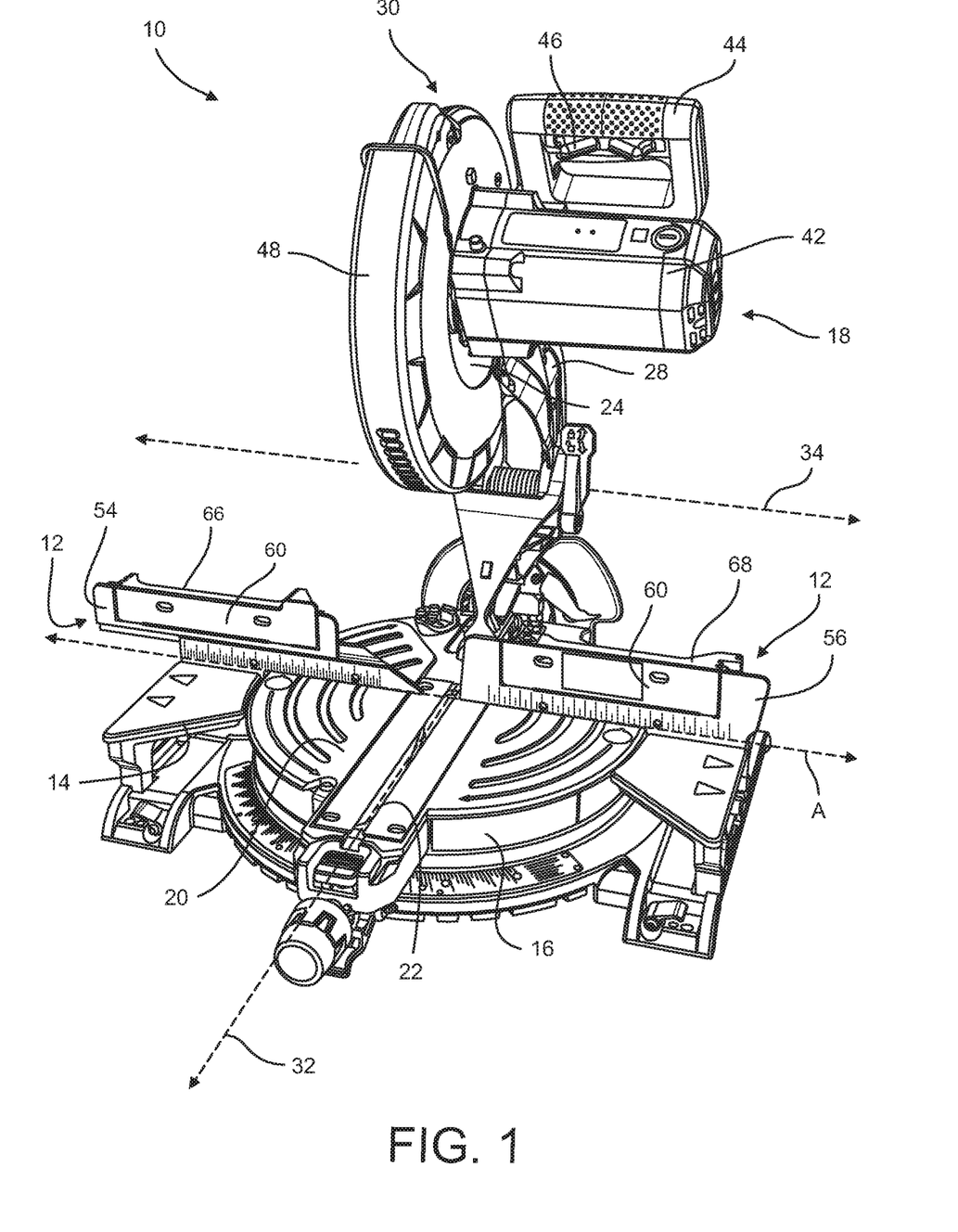
FIG. 1 shows a front perspective view of a miter saw with an adjustable fence assembly.

Referring now to FIG. 1, an embodiment of a miter saw 10 including an adjustable fence assembly 12 is depicted. As explained below, the adjustable miter fence 12 includes an elongate body 54,56 having an insert component 66, 68. The insert component 66, 68 includes a work piece abutment surface 60. The insert component 66, 68 is positionable in a first position and a second position with respect to the elongate body 54, 56. In the first position, the abutment surface 60 is arranged at the normal or default position in relation to the base 14. In the second position, the abutment surface 60 is offset a predetermined distance in front of the elongate body 52. The offset position of the abutment surface 60 increases the cut width capacity of the miter saw 10 and causes a corresponding increase in the cut height capacity of the miter saw 10.

In addition to the adjustable fence assembly 12, the miter saw 10 includes a base 14, a turntable 16, and a saw assembly 18. The base 14 is designed to sit in a stationary position on a solid surface or support structure. The base 14 is generally comprised of a hard metal material, such as aluminum, and provides a structure that supports the remaining components of the miter saw 10. The turntable 16 is rotatably supported on the base 14. The turntable 16 has a generally planar upper surface 20 that defines a slot 22. The planar upper surface 20 serves as a horizontal support surface for supporting a workpiece, such as wood or lumber. The slot 22 provides clearance for the saw blade 24 to extend below the horizontal support surface 20 during cuts so that a particular cut width capacity is provided.

The saw assembly 18 of the miter saw 10 includes a bevel arm 26, a cutting arm 28, and a cutting assembly 30. The bevel arm 28 is pivotably attached to the turntable 14 for pivotal movement about a bevel axis 32. The bevel arm 30 is pivotable about the bevel axis 32 between a vertical orientation (90c), as shown in FIG. 1, to an angle of 45° or more left of vertical (not shown). This pivoting allows the blade 24 to approach the turntable 16 from a bevel angle to perform angled cuts.

The cutting arm 28 is pivotably attached to the bevel arm 26 for pivotal movement about an axis 34 toward and away from the turntable 14. The cutting arm 28 supports the cutting assembly 30 above the turntable 14. The cutting assembly 28 includes a motor 42, a circular saw blade 24, a handle 44, a switch 46, and a blade guard 48. The motor 42 that is operable to rotate the circular saw blade 24. The handle 44 is connected to the bevel arm 30 to facilitate movement of the cutting head 28 in relation to the turntable 16. The handle 44 is designed and dimensioned to be grasped by a human hand when performing a cutting operation. This allows the user to easily pivot the cutting head 28 about axis 34. The switch 46 is positioned on the handle 44 to allow the user to easily energize and de-energize the motor 42 during a cutting operation. The blade guard 48 covers the top portion of the circular saw blade 24. During cutting operations, the cutting arm 28 is pivoted downwardly to bring the saw blade 24 into contact with a work piece positioned on the turntable 14.

As depicted in FIG. 1, the adjustable fence assembly 12 the elongate fence body includes a left lateral body portion 54 and a right lateral body portion 56 that define a first gap 62 therebetween. A part of the elongate work piece abutment surface 60 is positioned on each side of the gap 62. The fence insert includes a left lateral insert portion 66 and a right lateral insert portion 68 that define a second gap 64 therebetween. The first gap 62 and the second gap 64 are aligned with each other and with the slot 22 defined in the turntable 16. The gaps 62, 64 provide clearance for the saw blade 24 to pass therethrough and toward the slot 22.

Each fence body portion 54, 56 extends along an axis A defined on the turntable support surface 20. Each fence body portion 54, 56 is positioned at least partially over the turntable 16 and is attached to the base 14 at each side of the turntable. Each fence insert portion 66, 68 is removably secured to a body portion 54, 56 and includes a part of the elongate work piece abutment surface 60 that is arranged substantially perpendicular to the turntable support surface 20. When a work piece is positioned on the support surface 20 of the turntable, an edge of the work piece is held against the elongate work piece abutment surface 60 to facilitate accurate cuts at desired angles with respect to the fence assembly 12.

Figure 2:
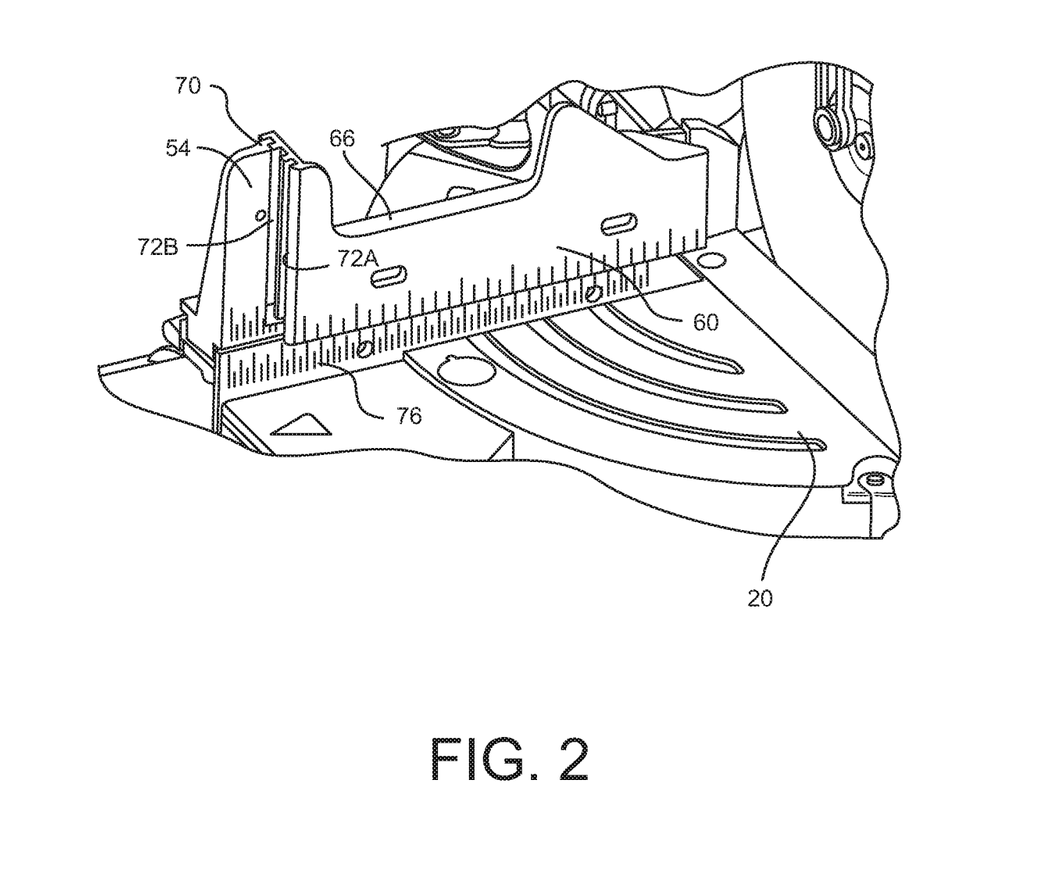
FIG. 2 is a front perspective view of the miter saw and fence assembly of FIG. 1 showing the left lateral portion of the fence assembly in greater detail.

In accordance with the present disclosure, the fence assembly 12 is positionable in a first configuration (FIG. 1) and a second configuration (FIG. 2) based on the position of the fence insert portions 66, 68 in relation to the fence body portions 54, 56. The fence body portions 54, 56 and the fence insert portions 66, 68 include complementarily configured connecting structures 70, 72 (FIG. 3) that cooperate to removably secure the fence insert 66 to the fence body 54 in at least a first position and a second position with respect to each other. In the first position, the abutment surface 60 of the insert portions 66, 68 and the abutment surface 76 of the body portions 54, 56 are aligned at the normal or default position for the fence assembly 12, as depicted in FIG. 1. In the second position, the abutment surface 60 of the insert portions 66, 68 is offset a distance F from the abutment surface 76 of the body portions 54, 56. Offsetting the abutment surface 60 from the fence body causes the cut height capacity to be increased. The offset distance F selected is dependent upon the configuration and dimensions of the miter saw 10 and the desired increase in cut height capacity. In one embodiment, the offset distance F is approximately 20 mm.

Figure 3:
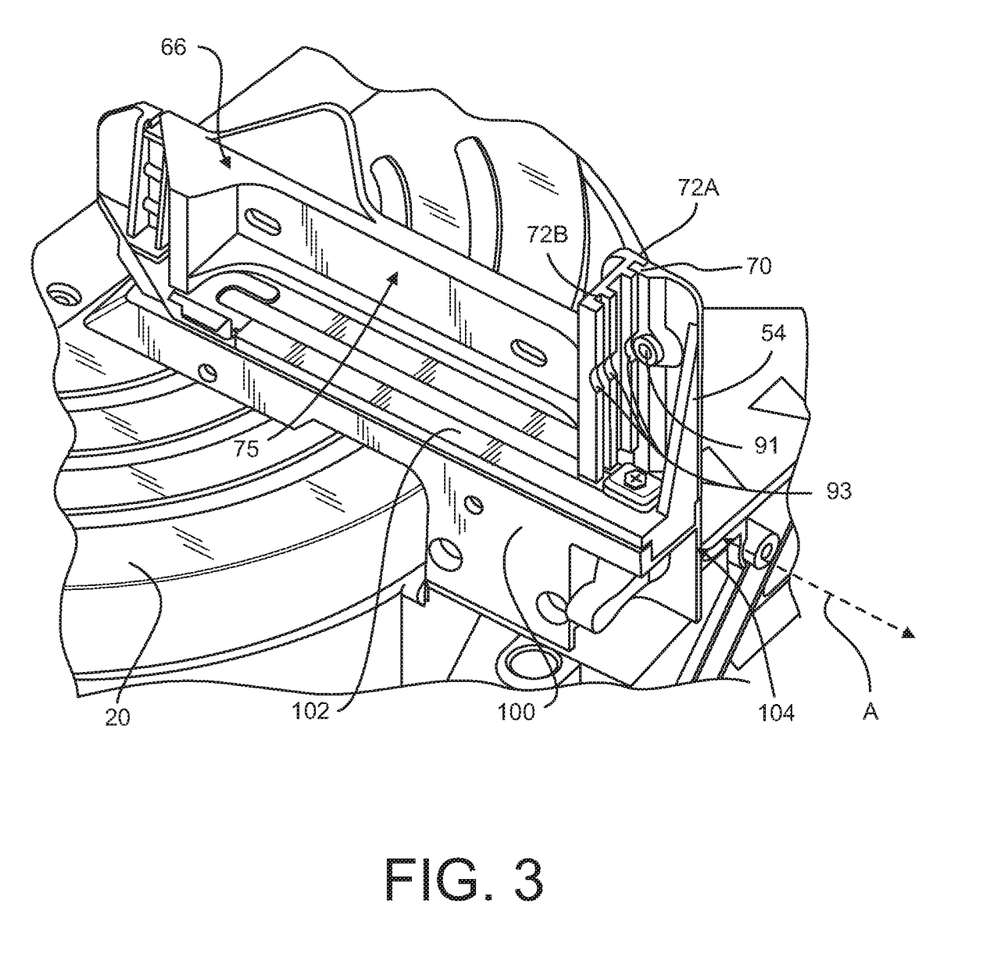
FIG. 3 is rear perspective view of the miter saw and fence assembly of FIG. 1 showing the left lateral portion of the fence assembly of FIG. 2.

As best seen in FIG. 3, the fence insert 66 includes a connecting structure 72 that comprises a pair of vertically oriented channel structures arranged at each lateral end of the fence insert. The fence body 54 defines an insert opening 75 for receiving the fence insert 66. The connecting structure 70 of the fence body 54 comprises a vertically oriented rail positioned at each lateral end (only visible at one end) of the insert opening 75. The rail 74 is configured to be received in a respective one of the channel structures 72 defined in the fence insert.

The pair of channel structures 72 includes a first channel structure 72A and a second channel structure 72B. The first channel structure 72A corresponds to the first position of the fence insert 66 relative to the fence body 52, and the second channel structure 72B corresponds to the second position of the fence insert 66 relative to the fence body 52. The vertical orientation of the channel structures 72 and rails 70 enables the fence inserts 66 to be switched between the first and second positions by sliding the inserts 66 upwardly until the rails 70 and channel structures 72 are disengaged. The inserts may then be reinserted into the fence bodies by aligning the channel structures and rails and sliding the inserts downwardly until the rails are received in the corresponding channel structures.

As seen in FIG. 3, a retaining mechanism 91 is utilized to secure the insert 66 to the fence body 54. Any suitable type of retaining mechanism may be used. In the embodiment of FIG. 3, the retaining mechanism 91 comprises a fastener or screw. The fastener 91 and the channel structures cooperate to secure the insert 66 to the fence body 54 once the insert has been seated in the fence body 54. In one embodiment, head of the fastener defines a cut out section. When the head of the fastener 91 is turned to a first predetermined angle or orientation with respect to the fence body 52, the cut out section is positioned to provide clearance for the channel structures 72A, 72B of the insert 66 to slide along the rail 70. Once the insert 66 is seated in the fence body, the head of the fastener 91 is rotated to a second position to secure the insert 66 to the fence body 54. In one embodiment, the channel structures 72A, 72B define cut-outs 93 (FIG. 3) that interlock with the head of the fastener 91 when the fastener is turned to the second position to secure the insert 66 to the fence body 54. In an alternative embodiment, a spring loaded detent may be utilized in a similar manner to secure the insert 66 to the fence body 54.

Figure 4:
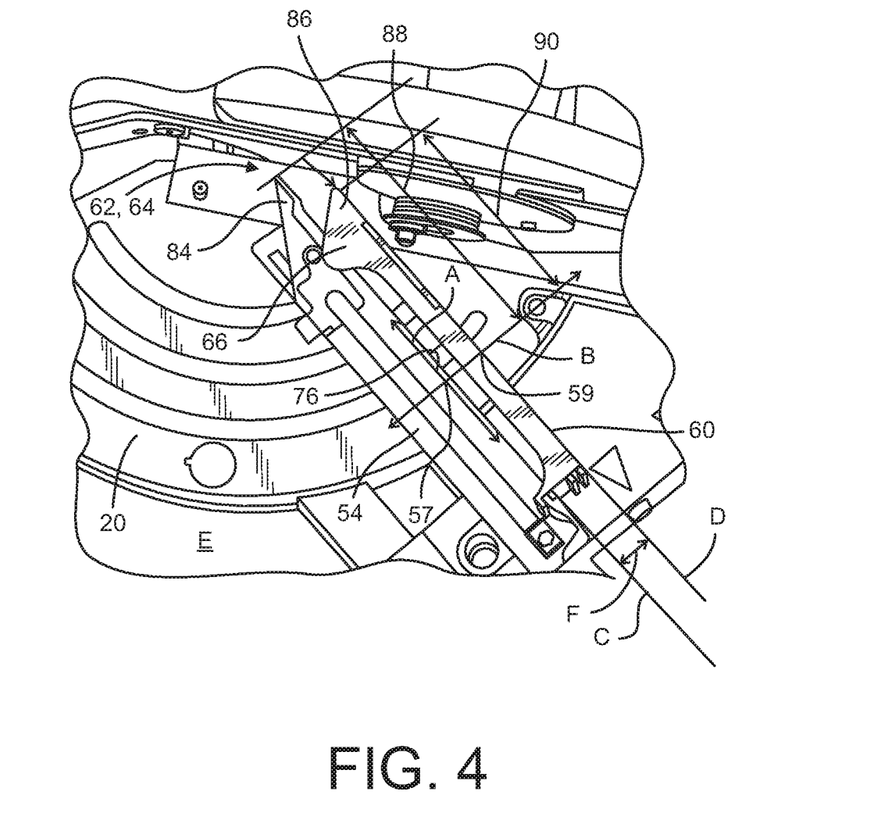
FIG. 4 is a top view of the miter saw and fence assembly of FIG. 1 showing the left lateral portion of the fence assembly of FIGS. 2 and 3.

When the fence insert 66 is in the first position as depicted in FIG. 3, the rails 70 is received in the first channel structures 72A at each end of the fence insert. Referring to FIG. 4, the fence body 54 has a front surface 76 that defines a portion of the work piece abutment surface of the fence assembly 12. The front surface 76 of the fence body 54 lies in a plane C, and the front surface 60 of the fence insert 66 lies in a plane D. With the fence insert 66 and fence body 54 in the first position with respect to each other, the plane C is coplanar with the plane D and perpendicular to the plane E defined by the turntable support surface 20.

When in the second position, the work piece abutment surface 60 of the fence insert 66 lies in a plane D that is parallel to and offset the distance F from the plane C. The fence insert 66 is offset from the fence body 54 along an axis B that intersects the axis A in a perpendicular manner, as depicted in FIG. 4. When the fence insert 66 is in the first position relative to the fence body 52, the work piece abutment surface 60 of the fence insert 66 and the abutment surface 76 of the fence body 54 are each positioned to intersect the axis B at a first point 57 along the axis B. When in the second position, the abutment surface 60 of the fence insert intersects the axis B at a second point 59 along the axis B that is offset from the first point 57.

Figure 5A:
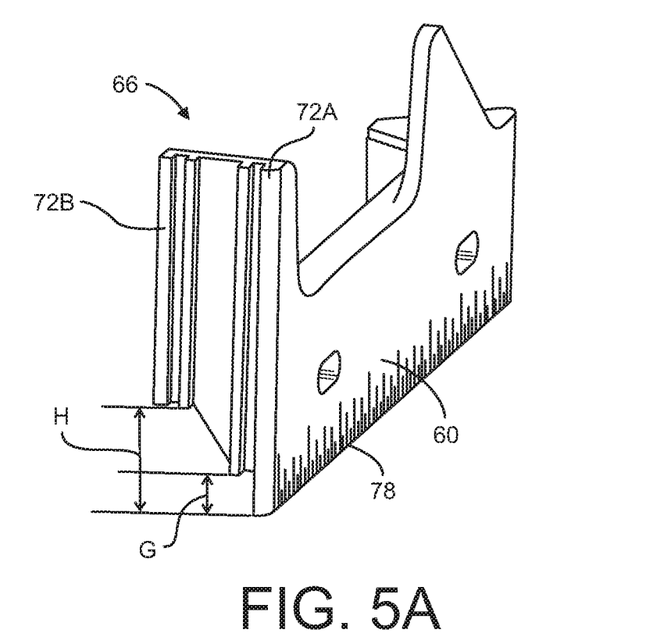
FIG. 5A is a front perspective view of the fence insert portion of the left lateral portion of the fence assembly.
Figure 5B:
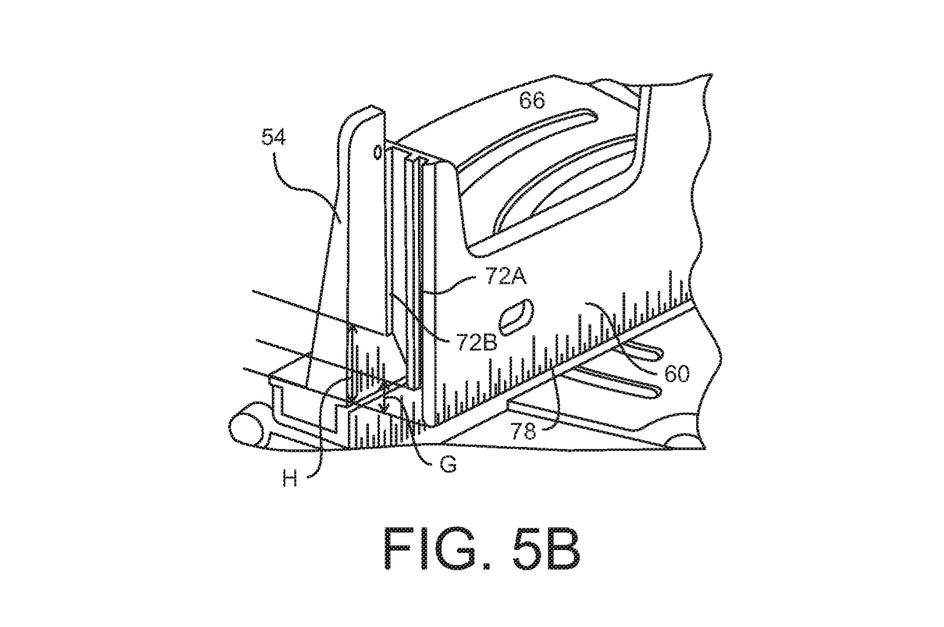
FIG. 5B is a front perspective view of the fence insert portion of FIG. 5A installed in fence.

Referring to FIGS. 5A and 5B, the fence inserts 66 may be configured so that the lower edge 78 of the work piece abutment surface 60 is lowered when the insert is moved from the first position to the second position. The inserts 66 define channel structures 72A, 72B at the lateral ends of the inserts 66 that are used to removably secure the inserts to the fence bodies 52. In one embodiment, the channel structures 72A, 72B are provided with varying lengths to enable the lower edge 78 of the work piece abutment surface 60 to be lowered when the insert 66 is moved to the second position.

As depicted in FIG. 5A, the channel structure 72A is positioned a distance G from the lower edge 78, and the channel structure 72B is positioned a distance H from the lower edge 78. When the insert is positioned in the second position (channel structure 72B), the lower edge 78 is moved closer to the turntable surface 20. When the insert 66 is moved forward, the lower edge 78 is moved closer to the support surface 20 to limit the ability of a work piece to pass under the lower edge 78 during cutting operations.

Referring again to FIG. 4, positioning a fence insert 66 in front of the miter saw fence poses the risk of the fence insert 66 being placed in the path of the saw blade 24 when the saw assembly is fully mitered to the left or right. To prevent the fence insert 66 from being placed in the path of the saw blade when the saw is mitered, the end portions of the inserts 66 are made shorter than the length of the fence bodies so that when the fence inserts are in the forward position, i.e., the second position, the inner lateral extent of the inserts does not intersect the path of the blade. For example, referring to FIG. 4, the left lateral end portion 54 includes a body end portion 84 that is positioned contiguous with the first gap 62, and the left lateral insert portion 66 includes an insert end portion 86 positioned contiguous with the second gap 64. The body end portion 84 is located a first distance 88 from the axis B, and the insert end portion 86 is located a second distance 90 from the axis B with the distance 88 being greater than the distance 90. Thus, when the insert 66 is in the forward position, the body end portion 84 and the insert end portion 86 are each approximately the same distance from the gaps 62, 64 when the saw is in the fully mitered left position as depicted in FIG. 4. The distances 88, 90 selected to space the insert end portion 86 from the gap 64 depends on the dimensions and configuration of the miter saw 10. In one embodiment, the distances 88, 90 are selected such that the difference between the first 88 and second distance 90 is between approximately 20.0 mm and 30.0 mm. In one particular embodiment, the difference between the first and second distances equals approximately 25.0 mm.

As mentioned above, the bevel arm 26 of the saw assembly enables the saw blade to be tilted with respect to turntable 16 to enable bevel cuts to be performed. In the embodiment of FIG. 1, the bevel arm 26 enables the saw blade to be tilted from vertical to approximately 45° left of vertical. In alternative embodiments, the bevel arm 26 may be configured to allow the blade to be tilted to approximately 45° right of vertical as well. When the saw blade is tilted to perform bevel cuts, a portion of the fence may be located in the path of the blade 24. To enable cuts to be performed with the saw tilted to the left (or right) of vertical, the fence assembly 12 is configured as a sliding fence. As a sliding fence, the upper portion of the fence on the left side of the turntable is configured to slide radially outwardly from the center of the turntable to provide clearance for the saw blade when it is beveled to the left. The upper portion of the fence to the right of the turntable may also be configured to slide radially outwardly if the saw assembly is capable of being beveled to the right.

Referring now to FIG. 3, to enable the slide functionality for the fence 12, the left lateral body portion 54 of the fence includes a base attachment portion 100 and a sliding portion 102. The base attachment portion 100 is fixed to the base 14 of the miter saw 10, and the sliding portion 102 is slidably connected to the base attachment portion 100. The sliding portion 102 of the fence body 54 includes the connecting structure 70 and opening 75 for the insert 66 so that the insert 66 is slidable with the sliding portion of the fence body 54.

The sliding portion is supported by the base attachment portion 100 in a manner that enables the sliding portion 102 to slide with respect to the base attachment portion 100 along axis A between a default position (FIG. 3) and a lateral position (FIG. 1). In the default position, the fence 12 provides full height support to perform cuts with the saw blade oriented vertically. In the lateral position, the upper portion of the fence is moved out of the way of the saw blade to allow bevel cuts to be performed. As best seen in FIG. 3, the sliding portion and the base attachment portion are slidably connected using a tongue and groove type connection 104 although any suitable type of connection or connecting structure may be used.

Figure 6:
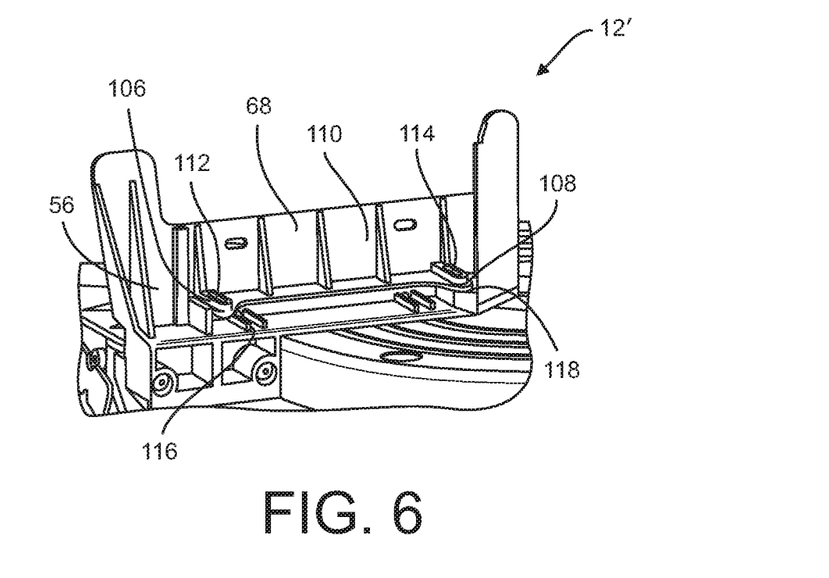
FIG. 6 is a rear perspective view of the right lateral portion of an alternative embodiment of the fence assembly of FIG. 1.
Figure 7:
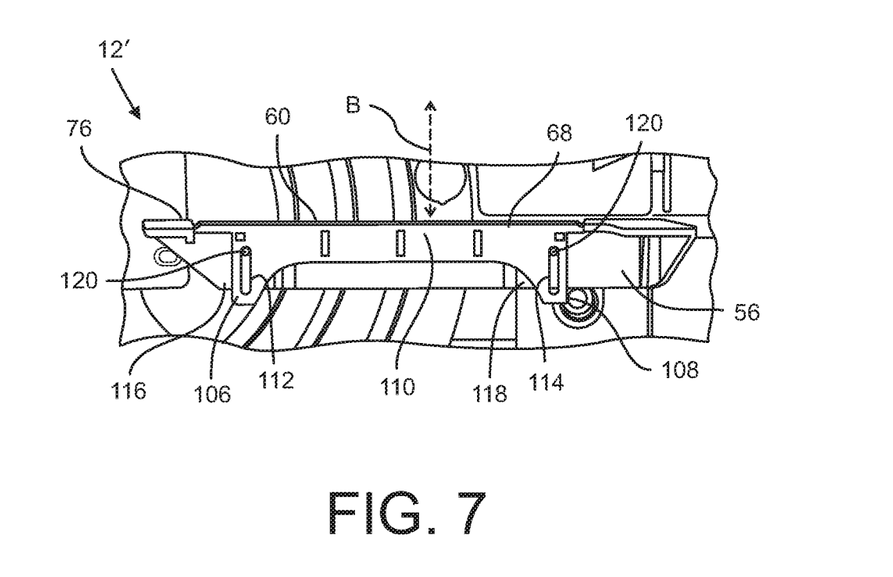
FIG. 7 is a top view of the right lateral fence portion of FIG. 6.

In the embodiment of the fence assembly depicted in FIGS. 1-5, the insert portion of the fence is adjustable between the normal position and the forward position by sliding the insert portion upwardly to remove the insert from the fence body and sliding the insert downward to install the insert to the fence body. FIGS. 6 and 7 depict an embodiment of a fence assembly 12' in which the insert portion 68 of the fence is movable between the normal position and the forward position by sliding the insert generally horizontally with respect to the fence body 56. Although only the right lateral body portion 56 of the fence assembly 12' is depicted in FIGS. 6 and 7, the discussion below is applicable to the left lateral portion of the fence assembly as well.

As depicted in FIGS. 6 and 7, the insert 68 includes a pair of beam-like structures 106, 108 that protrude from the rear side 110 of the insert component 68 (i.e., the side opposite the abutment surface 60). Each beam defines a longitudinal slot 112, 114 that extends therethrough. The fence body 56 includes beam support surfaces 116, 118 that support the beams 106, 108 and allow movement of the beams along the axis B relative to the fence body 56. The support surfaces 116, 118 each define a bore 120 (FIG. 7) for receiving a fastener, such as a screw or knob, (not shown). As seen in FIG. 7, when the insert 68 is positioned on the fence body 56, the longitudinal slots 112, 114 are aligned with the bores 120. A fastener is passed through each slot 112, 114 and into the bores 120 to secure the insert 68 to the fence body 56.

The longitudinal dimension of the slots 112, 114 is arranged generally perpendicular to the abutment surface 60 of the fence to enable the insert to be slid in the forward and rearward directions along axis B with respect to the fence body 56. The positions of the ends of the slots 112, 114 in relation to the positions of the bores/fasteners 120 define the forward and rearward limits of movement for the insert. In the rearward position, the abutment surface 60 of the insert 68 is aligned with the front surface 76 of the fence body as depicted in FIG. 6. The insert 68 may be secured at any position between and including the forward and rearward positions by tightening and loosening the fasteners in the slots.

While the invention has been illustrated and described in detail in the drawings and foregoing description, the same should be considered as illustrative and not restrictive in character. It is understood that only the preferred embodiments have been presented and that all changes, modifications and further applications that come within the spirit of the invention are desired to be protected.

What is claimed is:

1. A miter saw, comprising:
   a base;
   a turntable rotatable in relation to said base and including a work piece support surface, the work piece support surface defining a first plane;
   a support assembly attached to said turntable;
   a saw assembly attached to said support assembly and configured to cut a work piece supported on said turntable; and
   a fence assembly including (i) an elongate fence body supported by said base and positioned over said turntable, said fence body defining a second plane that is perpendicular to said first plane and having a first connecting structure, and (ii) a fence insert supported on top of said elongate fence body, said fence insert having an elongate work piece abutment surface and having a second connecting structure operably coupled to said first connecting structure, said elongate work piece abutment surface lying in a third plane that is perpendicular to the first plane,
   wherein (i) said fence assembly is positionable in a first configuration and a second configuration, (ii) when said fence assembly is positioned in said first configuration, said second connecting structure cooperates with said first connecting structure to secure said fence insert at a first position in relation to said fence body, and (iii) when said fence assembly is positioned in said second configuration, said second connecting structure cooperates with said first connecting structure to secure said fence insert at a second position in relation to said fence body,
   wherein, when said fence insert is secured at said first position, said elongate work piece abutment surface is arranged facing in a first direction and positioned such that said third plane is co-planar with said second plane,
   wherein, when said fence insert is secured at said second position, said elongate work piece abutment surface is arranged facing in the first direction and positioned such that said third plane is parallel to said second plane and offset a predetermined distance in front of said second plane,
   wherein:
      said fence body defines an insert opening in which the fence insert is received,
      said first connecting structure comprises a pair of vertically oriented rails positioned at opposing lateral ends of the insert opening, and
      said second connecting structure comprises:
         a first pair of vertically oriented channels arranged on opposing lateral ends of the fence insert, each channel in the first pair of channels being configured to receive one rail of the pair of vertically oriented rails of the first connecting structure, and
         a second pair of vertically oriented channels arranged on opposing lateral ends of the fence insert, each channel in the second pair of channels being configured to receive one rail of the pair of vertically orientated rails of the first connecting structure, and
      when said pair of vertically oriented rails is received in said first pair of vertically oriented channels, said fence insert is positioned at said first position, and
      when said pair of vertically oriented rails is received in said second pair of vertically oriented channels, said fence insert is positioned at said second position.

2. The miter saw of claim 1, wherein:
   said elongate fence body defines an additional work piece abutment surface which is positioned below the elongate work piece abutment surface,
   said additional work piece abutment surface lies in said second plane, and
   said additional work piece abutment surface faces in the first direction.

3. The miter saw of claim 1, wherein:
said support assembly includes a bevel arm pivotably connected to said turntable, and
said saw assembly is pivotably supported in relation to said bevel arm.

4. The miter saw of claim 1, wherein:
said elongate fence body includes a left lateral body portion and a right lateral body portion that are separated by a first gap,
said fence insert includes a left lateral insert portion supported on said left lateral body portion and a right lateral insert portion supported on said right lateral body portion, the left lateral insert portion and the right lateral insert portion being separated by a second gap,
said saw assembly includes a cutting blade, and
said support assembly is configured to move said cutting blade into said first gap and said second gap.

5. The miter saw of claim 4, wherein:
said left lateral body portion and said right lateral body portion each extend along a first axis that lies in said second plane,
said left lateral insert portion defines a first part of said elongate work piece abutment surface, and said right lateral insert portion defines a second part of said elongate work piece abutment surface,
said left lateral insert portion is positionable at said first position and said second position in relation to said left lateral body portion and said right lateral insert portion is positionable at said first position and said second position in relation to said right lateral body portion.

6. The miter saw of claim 1, wherein:
said elongate work piece abutment surface defines a lower edge,
when said fence insert is secured at said first position, said lower edge of said elongate work piece abutment surface is positioned at a first vertical height above said work piece support surface of said turntable,
when said fence insert is secured at said second position, said lower edge of said elongate work piece abutment surface is positioned at a second vertical height above said work piece support surface of said turntable, and
said second vertical height is less than said first vertical height.

7. The miter saw of claim 6, wherein:
said lower edge of said elongate work piece abutment surface defines a line, and said line is parallel to said first plane.

8. The miter saw of claim 1, wherein:
said elongate fence body includes a base attachment portion and a sliding portion;
said base attachment portion is fixed to said base;
said sliding portion including said first connecting structure; and
said sliding portion is slidably supported on said base attachment portion for sliding movement along a first axis that is parallel to said second plane between a first position and a second position, said second position providing clearance for said saw assembly to perform bevel cuts.

9. A miter saw, comprising:
a base;
a turntable rotatable in relation to said base and including a work piece support surface, the work piece support surface defining a first plane;
a support assembly attached to said turntable;
a saw assembly attached to said support assembly and configured to cut a work piece supported on said turntable; and
a fence assembly including (i) an elongate fence body supported by said base and positioned over said turntable, said fence body defining a second plane that is perpendicular to said first plane and having a first connecting structure, and (ii) a fence insert supported on top of said elongate fence body, said fence insert having an elongate work piece abutment surface and having a second connecting structure operably coupled to said first connecting structure, said elongate work piece abutment surface lying in a third plane that is perpendicular to the first plane,
wherein (i) said fence assembly is positionable in a first configuration and a second configuration, (ii) when said fence assembly is positioned in said first configuration, said second connecting structure cooperates with said first connecting structure to secure said fence insert at a first position in relation to said fence body, and (iii) when said fence assembly is positioned in said second configuration, said second connecting structure cooperates with said first connecting structure to secure said fence insert at a second position in relation to said fence body,
wherein, when said fence insert is secured at said first position, said elongate work piece abutment surface is arranged facing in a first direction and positioned such that said third plane is parallel to said second plane and offset a first distance from said second plane,
wherein, when said fence insert is secured at said second position, said elongate work piece abutment surface is arranged facing in the first direction and positioned such that said third plane is parallel to said second plane and offset a second distance from said second plane,
wherein said second distance is not equal to said first distance,
wherein said second connecting structure comprises a pair of beams that extend from a rear side of said fence insert, each of said beams defining a longitudinal slot having a longitudinal dimension arranged substantially parallel to a second axis, said second axis being perpendicular to said second plane;
wherein said first connecting structure comprises a pair of support surfaces configured to receive said beams, said beams being slidable with respect to said support surfaces between said first position and said second position along said second axis; and
wherein each support surface defines a bore aligned with the corresponding longitudinal slot, said bores being configured to receive fasteners for securing said beams to said support surfaces.

* * * * *